US012748883B2

(12) United States Patent
Guthrie

(10) Patent No.: US 12,748,883 B2
(45) Date of Patent: Sep. 29, 2026

(54) SYSTEMS AND METHODS FOR PROVIDING IMPROVED ACCOUNT MANAGEMENT SERVICES

(71) Applicant: CDW LLC, Vernon Hills, IL (US)

(72) Inventor: Jeremy Guthrie, Fitchburg, WI (US)

(73) Assignee: CDW LLC, Vernon Hills, IL (US)

( * ) Notice: Subject to any disclaimer, the term of this patent is extended or adjusted under 35 U.S.C. 154(b) by 184 days.

(21) Appl. No.: 18/085,695

(22) Filed: Dec. 21, 2022

(65) Prior Publication Data

US 2024/0211625 A1 Jun. 27, 2024

(51) Int. Cl.

| | |
|---|---|
| ***G06F 21/62*** | (2013.01) |
| ***G06F 21/60*** | (2013.01) |
| ***H04L 9/08*** | (2006.01) |
| ***H04L 9/40*** | (2022.01) |

(52) U.S. Cl.

CPC ........ *G06F 21/6245* (2013.01); *G06F 21/602* (2013.01); *H04L 9/0891* (2013.01); *H04L 63/0428* (2013.01); *H04L 63/0485* (2013.01); *H04L 63/0846* (2013.01)

(58) Field of Classification Search

CPC .... G06F 21/6245; G06F 21/602; G06F 21/62; G06F 21/60; H04L 9/0891; H04L 63/0428; H04L 63/0485; H04L 63/0846; H04L 9/0894; H04L 63/04; H04L 63/08

See application file for complete search history.

(56) References Cited

U.S. PATENT DOCUMENTS 7,950,051 B1 * 5/2011 Spitz .................. H04L 63/0846 709/229
8,875,261 B2 10/2014 Delia et al.
9,501,636 B1 11/2016 Elshishiny et al.
(Continued)

FOREIGN PATENT DOCUMENTS

CN 108964905 A * 12/2018 .......... H04L 9/0861
CN 108965324 A 12/2018
(Continued)

OTHER PUBLICATIONS

International Application No. PCT/US2023/084994, International Search Report and Written Opinion, mailed Mar. 1, 2024.

*Primary Examiner* — Shahriar Zarrineh
(74) *Attorney, Agent, or Firm* — MARSHALL, GERSTEIN & BORUN LLP

(57) ABSTRACT

Systems and methods for providing improved account management services is disclosed herein. An example method may include transmitting, from a remote computing device, an encryption key and an account list to a base management node of a customer. The example method may further include receiving, from the base management node, an encrypted updated account list, and decrypting, by a secure off-loader stored on the remote computing device, the encrypted updated account list. The example method may further include analyzing, by the secure off-loader, the account list in a storage location of the remote computing device to determine stored entries associated with the account list that have an analogous entry in the decrypted updated account list. The example method may further include replacing, by the secure off-loader, each stored entry in the account list with the analogous entry in the decrypted updated account list.

13 Claims, 5 Drawing Sheets

(56) References Cited

U.S. PATENT DOCUMENTS

| | | | | |
|---|---|---|---|---|
| 11,055,417 | B2 | 7/2021 | Bhatia et al. | |
| 11,250,142 | B1 * | 2/2022 | Wu | H04L 9/0819 |
| 2006/0101508 | A1 * | 5/2006 | Taylor | G07C 9/37<br>340/5.82 |
| 2010/0100948 | A1 * | 4/2010 | Delia | H04L 63/0846<br>726/6 |
| 2012/0151563 | A1 * | 6/2012 | Bolik | G06F 21/41<br>726/6 |
| 2013/0275747 | A1 * | 10/2013 | Brumback | G06F 21/602<br>713/155 |
| 2014/0232518 | A1 * | 8/2014 | Stoehr | G07B 15/04<br>340/5.6 |
| 2016/0149924 | A1 * | 5/2016 | Iverson | H04L 63/102<br>726/4 |
| 2016/0307194 | A1 * | 10/2016 | Bhatnagar | H04L 63/0838 |
| 2016/0357956 | A1 * | 12/2016 | Elshishiny | H04L 63/083 |
| 2017/0132409 | A1 * | 5/2017 | Elshishiny | G06F 21/31 |
| 2018/0176195 | A1 | 6/2018 | Pangam et al. | |
| 2019/0028447 | A9 * | 1/2019 | Pangam | H04L 63/083 |
| 2019/0318100 | A1 * | 10/2019 | Bhatia | G06F 21/554 |
| 2020/0134199 | A1 * | 4/2020 | Conway | G06F 16/2458 |
| 2020/0137105 | A1 * | 4/2020 | Endler | G06F 21/6218 |
| 2021/0203661 | A1 * | 7/2021 | Sankey | H04L 9/3247 |
| 2022/0156334 | A1 * | 5/2022 | De Paolis | G06Q 30/02 |
| 2023/0004669 | A1 * | 1/2023 | Langseth | G06F 16/258 |
| 2024/0037086 | A1 * | 2/2024 | Lisagor | G06F 16/2358 |
| 2024/0305442 | A1 * | 9/2024 | Collinge | H04L 9/0836 |

FOREIGN PATENT DOCUMENTS

| | | | | | |
|---|---|---|---|---|---|
| CN | 109952587 | A | * | 6/2019 | H04L 63/102 |
| CN | 111488331 | A | * | 8/2020 | G06F 21/6218 |
| CN | 112425114 | A | * | 2/2021 | G06F 21/45 |
| CN | 114707128 | A | * | 7/2022 | G06F 21/31 |
| CN | 115374424 | A | * | 11/2022 | G06F 21/6218 |
| CN | 121210475 | B | * | 4/2026 | |
| JP | 2015170215 | A | * | 9/2015 | |
| WO | WO-2017117081 | A1 | * | 7/2017 | H04L 63/083 |
| WO | WO-2022002959 | A1 | * | 1/2022 | H04L 63/10 |
| WO | WO-2022096602 | A1 | * | 5/2022 | G06F 21/6209 |

* cited by examiner

SYSTEMS AND METHODS FOR PROVIDING IMPROVED ACCOUNT MANAGEMENT SERVICES

FIELD OF THE DISCLOSURE

The present disclosure generally relates to account management services, and in particular, systems and methods for providing improved account management services.

BACKGROUND

The background description provided herein is for generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Information technology (IT) includes the use of computers to store, transmit, and/or process information. IT is a critical component of most businesses in today's Internet-based economy. Traditionally, management and delivery of IT services has required IT services companies to physically manage business equipment (e.g., computers, telephones, mobile devices, software, data, etc.). For example, IT service providers have required direct physical access to their customers' respective computing environments. Physical access has generally required that 1) customer business equipment be positioned at a site remote from the customer's business (e.g., at the service provider's data center or the data center of a third party) and/or that 2) customers allow service providers physical access to customer business equipment on the premises of the customer. The physical access requirements have wasted time and resources of the IT service provider and the customer alike.

Prior attempts to facilitate remote administration of IT services have focused on an ad-hoc approach, and have been limited in scope/applicability. Prior attempts to facilitate remote administration of IT services have encountered numerous issues, including extensive initial and/or ongoing configuration requirements, high cost, the requirement to field complex hardware, security issues, data protection concerns, cloud computing incompatibilities, and overall inflexibility. Modern IT infrastructures are complex, heterogeneous computing environments, with complex networking capabilities. Yet existing approaches to facilitating remote administration of IT services lack a consistent, scalable framework.

Existing services and/or business equipment must be configured by hand before being deployed to a customer, and must be continually updated and reconfigured. IT service providers must create one-off hardware and/or software configurations for each customer, and the configurations are not reusable. IT service providers often ship pre-configured servers, laptops, and other full-profile computing equipment to customers. These pre-configured machines may include computer code and data that is proprietary to the IT service providers. This private code and data may be necessarily unsecured, and may expose IT service providers to cyber security threats/vulnerabilities, including hacking and theft of intellectual property. Prior attempts to automate the administration of IT services have been incompatible with cloud computing environments because the automation is intended to support traditional customer infrastructure, and not the cloud computing paradigm, wherein some computing resources may be provided by a third party. Recovering leased or loaned hardware and/or software for maintenance and/or service end-of-life are additional problems faced by IT service providers.

The prior attempts at automating the provision of IT services have also been less flexible. Historically, before the IT service management company can begin to administer services on behalf of the customer, the IT service company has been required to build a sample physical server, and to physically ship that sample physical server to the customer. The server may be costly to produce and may include valuable hardware and/or software assets. In addition, to provide geographic redundancy, multiple server computers may be required in multiple physical locations per customer. Each may need to be separately constructed and shipped. Moreover, the network interfaces of the individual servers may be configured for packet transmission and reception, requiring physical media reading/writing and kernel-space and/or super user access.

Prior solutions also lack dedicated connectivity. Services may not always be on, may not always be enabled, and may not always be monitored. Services may lack consistent logging and security upgrades (e.g., multi-factored authentication). User management may be altogether absent, and may not provide network device management, such that network devices must be managed with respect to every host. If a customer has many different services that require support, then the IT services provider must negotiate access individually, and request that the customer modify the customer's network configuration to accommodate the IT services provider's access to each individual service.

Accordingly, flexible and consistent methods and systems for improved account management services by IT service providers are needed, to reduce costs and risks to IT services providers and customers, and to increase productivity, security and connectivity.

BRIEF SUMMARY

This Brief Summary is provided to introduce a selection of concepts that are further described below in the Detailed Description in a simplified form. This Brief Summary is not intended to identify key features or essential features of the claimed subject matter, nor is it intended to be used to limit the scope of the claimed subject matter.

In one aspect, a computer-implemented method for providing improved account management services is provided. The method includes: transmitting, from a remote computing device, an encryption key and an account list to a base management node of a customer; receiving, from the base management node, an encrypted updated account list; decrypting, by a secure off-loader stored on the remote computing device, the encrypted updated account list; analyzing, by the secure off-loader, the account list in a storage location of the remote computing device to determine stored entries associated with the account list that have an analogous entry in the decrypted updated account list; and replacing, by the secure off-loader, each stored entry in the account list with the analogous entry in the decrypted updated account list.

In a variation of this embodiment, the account list includes an account credential corresponding to a user, and the account credential includes at least one of: (i) an account password, (ii) an account group membership, or (iii) an account activity status.

In another variation of this embodiment, analyzing the account list in the storage location of the remote computing device further includes: parsing, by the secure off-loader, each entry of the decrypted updated account list; comparing, by the secure off-loader, each parsed entry of the decrypted updated account list with the stored entries associated with the account list; and based on the comparing, determining the stored entries associated with the account list that have the analogous entry in the decrypted updated account list.

In yet another variation of this embodiment, the method further includes: responsive to replacing each stored entry in the account list with the analogous entry, updating, by the secure off-loader, a local configuration stored in the storage location of the remote computing device to indicate a recent update to the account list.

In still another variation of this embodiment, the method further includes: determining, by the remote computing device, a number of encrypted updated account lists received at the remote computing device during a first period; comparing the number of encrypted updated account lists received during the first period to a updated account list receipt threshold; responsive to determining that the number of encrypted updated account lists received during the first period exceeds the updated account list receipt threshold, generating, by the remote computing device, an alert for transmission to the customer; and blocking, by the remote computing device, any subsequent data transmission between the remote computing device and the base management node of the customer.

In yet another variation of this embodiment, the method further includes: determining, by the remote computing device, a number of periods since the encrypted updated account list was received; comparing the number of periods to a period threshold; and responsive to determining that the number of periods exceeds the period threshold, generating, by the remote computing device, an alert for transmission to the customer indicating that the account list should be updated.

In still another variation of this embodiment, the account list includes accounts for a plurality of users, each account includes one or more account group attributes, and the method further includes: receiving, at the remote computing device, an update to an account group attribute for an account in the account list; and updating, by the secure off-loader, the account group attribute for the account in the account list.

In yet another variation of this embodiment, the remote computing device is a first remote computing device, the base management node is communicatively coupled to a second remote computing device, and the method further includes: transmitting, by the base management node, the encryption key and the account list to the second remote computing device; modifying, by the second remote computing device, an account credential included as part of the account list to generate an updated account list; encrypting, by the second remote computing device, the updated account list using the encryption key; and transmitting the encrypted updated account list to the base management node.

In another embodiment, a computing system is provided. The computing system includes: one or more processors; and a memory storing instructions. The instructions, when executed by the one or more processors, cause the computing system to: transmit an encryption key and an account list to a base management node of a customer, receive, from the base management node, an encrypted updated account list, decrypt the encrypted updated account list, analyze the account list to determine stored entries associated with the account list that have an analogous entry in the decrypted updated account list, and replace each stored entry in the account list with the analogous entry in the decrypted updated account list.

In a variation of this embodiment, the account list includes an account credential corresponding to a user, and the account credential includes at least one of: (i) an account password, (ii) an account group membership, or (iii) an account activity status.

In another variation of this embodiment, the instructions, when executed, further cause the computing system to analyze the account list by: parsing each entry of the decrypted updated account list; comparing each parsed entry of the decrypted updated account list with the stored entries associated with the account list; and based on the comparing, determine the stored entries associated with the account list that have the analogous entry in the decrypted updated account list.

In yet another variation of this embodiment, the instructions, when executed, further cause the computing system to: responsive to replacing each stored entry in the account list with the analogous entry, update a local configuration to indicate a recent update to the account list.

In still another variation of this embodiment, the instructions, when executed, further cause the computing system to: determine a number of encrypted updated account lists received during a first period; compare the number of encrypted updated account lists received during the first period to a updated account list receipt threshold; responsive to determining that the number of encrypted updated account lists received during the first period exceeds the updated account list receipt threshold, generate an alert for transmission to the customer; and block any subsequent data transmission to the base management node of the customer.

In yet another variation of this embodiment, the instructions, when executed, further cause the computing system to: determine a number of periods since the encrypted updated account list was received; compare the number of periods to a period threshold; and responsive to determining that the number of periods exceeds the period threshold, generate an alert for transmission to the customer indicating that the account list should be updated.

In still another variation of this embodiment, the account list includes accounts for a plurality of users, each account includes one or more account group attributes, and the instructions, when executed, further cause the computing system to: receive an update to an account group attribute for an account in the account list; and update the account group attribute for the account in the account list.

In yet another embodiment, a non-transitory computer readable medium containing program instructions is provided. The program instructions, when executed, cause a computer to: transmit an encryption key and an account list to a base management node of a customer; receive, from the base management node, an encrypted updated account list; decrypt the encrypted updated account list; analyze the account list to determine stored entries associated with the account list that have an analogous entry in the decrypted updated account list; and replace each stored entry in the account list with the analogous entry in the decrypted updated account list.

In a variation of this embodiment, the account list includes an account credential corresponding to a user, and the account credential includes at least one of: (i) an account password, (ii) an account group membership, or (iii) an account activity status.

In another variation of this embodiment, the instructions, when executed, further cause the computer to analyze the account list by: parsing each entry of the decrypted updated account list; comparing each parsed entry of the decrypted updated account list with the stored entries associated with the account list; and based on the comparing, determine the stored entries associated with the account list that have the analogous entry in the decrypted updated account list.

In yet another variation of this embodiment, the instructions, when executed, further cause the computer to: responsive to replacing each stored entry in the account list with the analogous entry, update a local configuration to indicate a recent update to the account list.

In still another variation of this embodiment, the instructions, when executed, further cause the computer to: determine a number of encrypted updated account lists received during a first period; compare the number of encrypted updated account lists received during the first period to a updated account list receipt threshold; responsive to determining that the number of encrypted updated account lists received during the first period exceeds the updated account list receipt threshold, generate an alert for transmission to the customer; and block any subsequent data transmission to the base management node of the customer.

DETAILED DESCRIPTION

Figure 1:
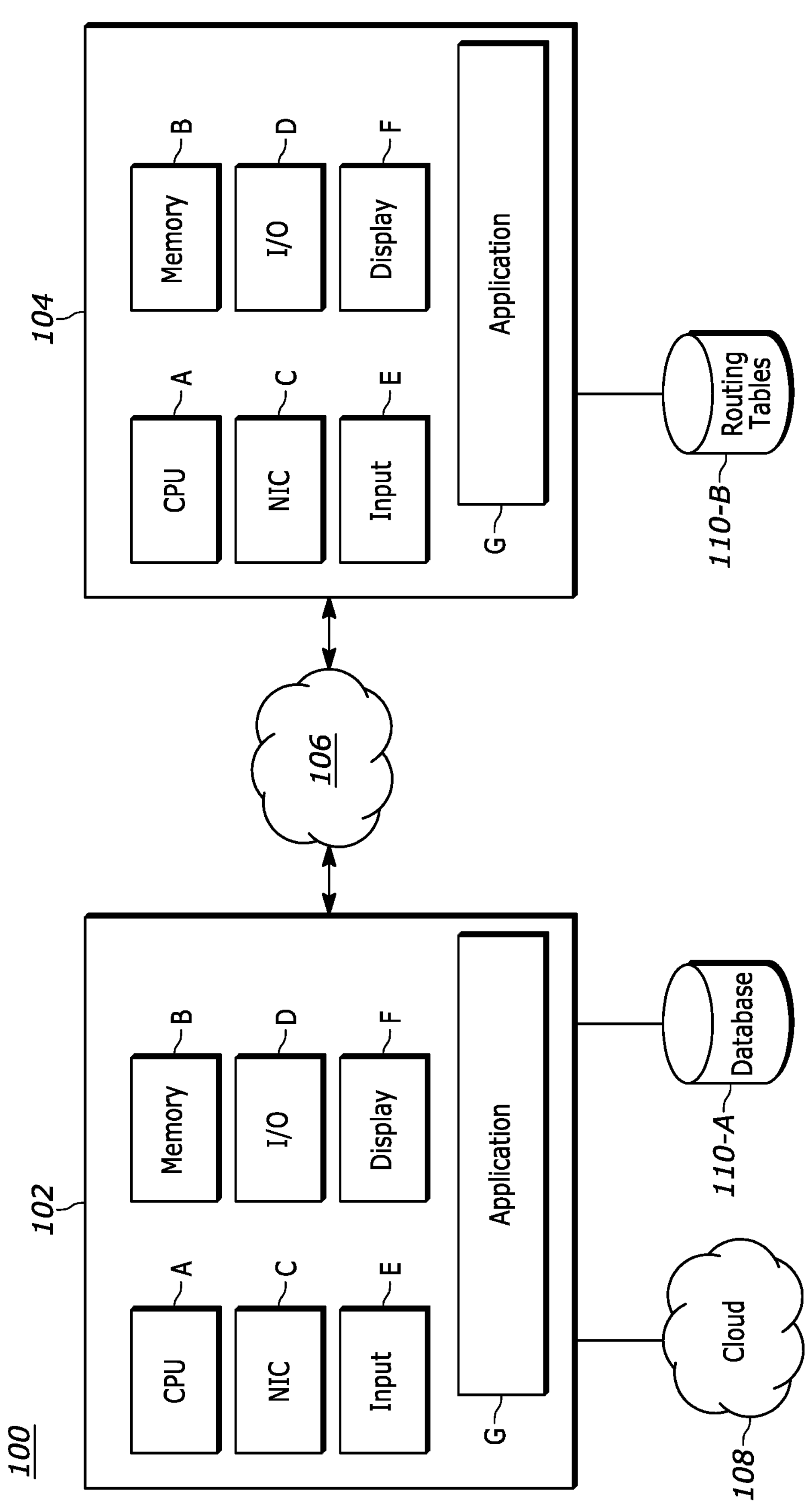
FIG. 1 depicts an exemplary system diagram of a system configured to provide improved account management services, in accordance with various embodiments herein.

The present techniques include a description of systems and methods for providing improved account management services, wherein an IT services company/provider may generate an avatar (e.g., a virtual machine and/or physical device/appliance) and distribute the avatar to a customer of the IT services company. The avatar may initiate a persistent network link between a network of the IT services company and a network of the customer. The avatar may permit the IT services company to access the network environment of the customer for the purpose of managing the IT services comprising the network environment, as well as performing routing functions. The IT services provider may be a corporation having separate divisions for a set of one or more facets of IT managed services operations, including without limitation, server management, configuration, field services, managed services, warranty services, etc. The avatar may allow each of the separate divisions of the IT services provider, as well as authorized third parties, to independently and simultaneously administer respective portions of the customer's computing environment. The avatar may include instructions for querying the customer's environment and reporting on the validity of aspects of the customer's environment, which the IT services provider may use to improve and/or certify aspects of the customer's IT infrastructure. The following disclosure includes numerous examples of functionality facilitated by the present techniques.

More specifically, the present techniques include systems and methods that enable users to update account listings securely and routinely in a manner that conventional systems are incapable of providing. Conventional account management services involve establishing accounts for customers in one of two ways: shared accounts and individual accounts. Both conventional account establishment methods suffer from several drawbacks. Shared accounts generally allow multiple users of a single customer to access the services provided by a service provider, but as a result, it is very difficult to determine which particular user(s) performed actions on behalf of the shared account. By contrast, individual accounts allow each individual user of a customer to access the services provided by the service provider, but these accounts create significant logistical issues for service providers when the individual accounts change for any reason (e.g., account user quits, permissions change, etc.). Thus, these conventional account management services are either inefficient (individual) or lack the granularity necessary for customers to make informed decisions regarding updates to their account (shared). Moreover, these conventional services generally lack security, such that updated account credentials, permissions, and/or other account entries may be impermissibly accessed by external actors.

Thus, it is an objective of the present disclosure to eliminate these and other problems with conventional account management services via a customer base management node (BMN) and a secure off-loader operating in conjunction with a customer host computing device. In particular, the BMN and secure off-loader of the present disclosure alleviate the issues present with conventional account management services by securely updating account listings through encrypted account list updates that are tailored for each specific customer. These encrypted account list updates may generally include customized formatting and/or other features that enable the secure off-loader and other components of the present disclosure to efficiently analyze and interpret the encrypted account list updates for each individual customer in a manner that provides suitable granularity for all customers, regardless of their specific account configuration.

In accordance with the above, and with the disclosure herein, the present disclosure includes improvements in computer functionality or in improvements to other technologies at least because the present disclosure describes that, e.g., account management services, and their related various components, may be improved or enhanced with the disclosed systems and methods that provide more robust, secure, and efficient account management services for respective customers/users. That is, the present disclosure describes improvements in the functioning of an account management system itself or "any other technology or technical field" (e.g., the field of IT services, and more specifically account management services) because the disclosed systems and methods improve and enhance operation of account management services by introducing an encrypted service architecture that eliminates security issues and other inefficiencies typically experienced over time by account management systems lacking such systems and methods. This improves the state of the art at least because such previous account management systems are inefficient and insecure, as they lack the ability for encrypted data transfer through a customer-specific management node in a manner that enables any customer device to transmit account list updates that update their centralized account listing in accordance with their specific account configuration.

In addition, the present disclosure includes applying various features and functionality, as described herein, with, or by use of, a particular machine, e.g., a remote computing device, a base management node (BMN), a secure off-loader, and/or other hardware components as described herein.

Moreover, the present disclosure includes specific features other than what is well-understood, routine, conventional activity in the field, or adding unconventional steps that demonstrate, in various embodiments, particular useful applications, e.g., decrypting, by a secure off-loader stored on the remote computing device, the encrypted updated account list; analyzing, by the secure off-loader, the account list in a storage location of the remote computing device to determine stored entries associated with the account list that have an analogous entry in the decrypted updated account list; and replacing, by the secure off-loader, each stored entry in the account list with the analogous entry in the decrypted updated account list.

Example System

FIG. 1 depicts various aspects of an example system 100 configured to provide improved account management services, in accordance with various embodiments herein. The high-level architecture of system 100 includes both hardware and software components, as well as various channels for communicating data between the hardware and software components. The system 100 may include hardware and software modules that employ methods of building, deploying and connecting both hardware and software. Using these modules, the system 100 and other components/configurations described herein may enable the improved account management services disclosed specifically in reference to FIGS. 4 and 5. The modules may be implemented as computer-readable storage memories containing computer readable instructions (i.e., software) for execution by a processor of the system 100.

The system 100 may include a remote computing device 102, which may be communicatively coupled to an avatar 104 and/or to other components of system 100 via a network 106. The remote computing device 102 may include one or more personal computer, smart phone, laptop, tablet, blade server and/or other suitable computing device. The remote computing device 102 may include various hardware components, such as a central processing unit (CPU) 102A, a memory 102B, a network interface controller (NIC) 102C, an input/output (I/O) controller 102D, input device 102E, and/or a display device 102E. The CPU 102A may include any number of processors, including one or more graphics processing unit (GPU). The memory 102B may include a random-access memory (RAM), a read-only memory (ROM), a hard disk drive (HDD), a magnetic storage, a flash memory, a solid-state drive (SSD), and/or one or more other suitable types of volatile or non-volatile memory. The NIC 102C may include one or more physical networking devices (e.g., an Ethernet device, a wireless network controller, etc.). The NIC 102C may allow the remote computing device 102 to communicate with other components of the system 100 via a computer network such as the network 106. The I/O controller 102D may receive input and output from one or more input device (e.g., a peripheral device such as a detached keyboard or mouse) and one or more output device (e.g., a computer monitor, speaker, etc.) and an integral device such as a capacitive touch screen of a portable computing device. The I/O controller 102D may manage data communications between the CPU 102A and the memory 102B by, for example, loading data in a storage region of the memory 102B into a transient memory region of the memory 102B such as an application 102-G.

In an embodiment, the application 102-G may include executable program instructions (i.e., software) that, when executed by the CPU 102-A, causes one or more virtual machine instance stored in the memory 102-B to be loaded and/or modified. The one or more virtual machine instance may be stored in and/or retrieved from a database 110-A. In some embodiments, the application 102-G may also generate one or more virtual machine instances. The virtual machine instances may be containerized, in some embodiments using operating system-level virtualization using suitable containerizing techniques (e.g., Docker, Kubernetes, etc.).

The database 110-A may be directly coupled to the remote computing device 102 and/or accessible via the network 106. The database 110-A may be any suitable database (e.g., a structured query language (SQL) database, flat file database, NoSQL database, key-value store, file system-backed data store, etc.). In some embodiments the database 110-A may be storage area network (SAN) or a network attached storage (NAS) or a direct-attached storage (DAS). In an embodiment, the application 102-G may create, modify, or delete aspects of the database 110-A (e.g., by creating a new SAN on behalf of a customer). Portions of the one or more virtual machines may be stored in and retrieved from the database 110-A.

The system 100 may include multiple, differing parallel instances. For example, a first customer may be designated a first instance of the system 100. A second customer may be designated a second system instance of the system 100. The first system instance and the second system instance may be instantiated as respective VM instances, having segregated networks. The first system VM and second system VM may be isolated such that they are mutually inaccessible. The first system and the second system may, respectively, generate a set of one or more virtual machine instances. In an embodiment, a single customer may be associated with multiple instances of the system 100. For example, an A instance of the system 100 and a B instance of the system 100 may be created. The A instance and the B instance may be associated with a customer C, such that the customer uses the two instances for different business and/or practical purposes (e.g., to comply with data security requirements). In some cases, the A instance and B instance may be reciprocally accessible via a computer network, or unilaterally accessible (i.e., from A→B or B→A). Instance A and instance B may be respectively owned/controlled by one or more entities. In some embodiments, the system 100 may be instantiated wholly or partially in, and/or communicatively coupled to, one or more computing cloud 108 (e.g., a private cloud owned by the IT services provider and/or a third party public cloud). More than two instances may be used to implement embodiments of the system 100, as discussed below. Specifically, a connection funnel may maintain separation between networks of unrelated customers within the system 100 or within multiple instances of the system 100 belong to respective unrelated customers.

The remote computing device 102 may include a collection of servers and/or VMs instantiated in public and/or private cloud computing environments and/or data centers. The remote computing device 102 may include hardware and/or software owned by a customer of the IT services provider. However, in general, the remote computing device 102 may be administered and controlled by the IT services provider. The IT services provider's administration of the remote computing device 102 and the system 100 may include the deployment of the avatar 104, as either a physical server or a VM instance. For example, IT services provider may administer the remote computing device 102 of the system 100 to add/remove computational resources (e.g., processors, memory, storage, etc.), add/remove applications, to add/remove connectivity (e.g., firewall rules), etc. Upstream services (i.e., services that are accessible to the remote computing device 102) may be made accessible to the network 106 via the creation of one or more tunnels in the remote computing device 102.

As noted, in some embodiments, the remote computing device 102 may connect to other components via a computer network such as the network 106. The network 106 may be a wireless network of a consumer network provider (e.g., a Global System for Mobile communication (GSM) provider or Code Division Multiple Access (CDMA) provider). In some embodiments the network 106 may be a private wireless network. In some embodiments, the network 106 may include an Internet Service Provider (ISP) such as a Tier 1 and/or Tier 2 network. In some embodiments, the network 106 may include the Internet and/or another suitable network (e.g., a local area network (LAN), a metropolitan area network (MAN), a wide area network (WAN), a mobile, a wired or wireless network, a virtual private network (VPN), etc.). The system 100 may include one or more application programming interface (API) service provided by a third party and/or the IT services provider (not depicted).

The avatar 104 may be leased or loaned to the customer backend component of the system 100, as a hardware appliance for the customer's use during the provision of services by the IT services provider, or as a virtual image that the customer could implement in the customer's own virtualization environment for use during the provision of services by the IT services provider. The avatar 104 may include various hardware components, such as a CPU 104-A, a memory 104-B, a NIC 104-C, an I/O controller 104-D, an input device 104-E, a display device 104-F, and an application 102-G. The CPU 104-A may include any number of processors, possibly including one or more GPUs. The memory 104-B may include a RAM, a ROM, a HDD, a magnetic storage, a flash memory, an SSD, and/or one or more other suitable types of volatile or non-volatile memory. The NIC 104-C may include one or more physical networking devices (e.g., an Ethernet device, a wireless network controller, etc.). The NIC 104-C may allow the avatar 104 to communicate with other components of the system 100 via a computer network such as the network 106. The input device 104-E may include one or more peripheral device such as a detached keyboard or mouse, or an integral device such as a capacitive touch screen of a portable computing device. The output device 104-F may be a suitable display device such as a computer monitor, capacitive touch screen, television screen, etc. In some embodiments, the avatar 104 may be a VM. In other embodiments, the avatar 104 may be a VM downloaded by the customer from the IT service provider. The avatar VM may be a large (e.g., gigabytes or larger) image file.

In some embodiments, the avatar 104 may be installed at the premises of the customer or a facility related to a customer (e.g., a corporate office, datacenter, etc.). In those embodiments, a customer employee/contractor may interact with the avatar 104 via the input device 104-E, the display device 104-F, and/or via a computer terminal communicatively coupled to the avatar 104. For example, an exemplary physical avatar may include a power supply (not shown), a set of data transfer and power cables (not shown), and a set of hardware ports (not shown). However, in other embodiments, the avatar may be a VM (i.e., composed of software). A power supply may include a direct current (DC) and/or alternating current (AC) power supply suitable for the electric power requirements of the avatar 104. The set of data transfer and power cables may include any suitable cabling (e.g., 2-wire, 4-wire, Ethernet cables, USB cables, HDMI cables, etc.). The set of hardware ports may include one or more suitable power and/or data transmission ports, including without limitation RJ-45 connector ports (e.g., Ethernet ports), AC/DC power ports, HDMI ports, USB ports, etc. In hardware embodiments, the avatar 104 may be of any suitable dimensions, and may be implemented using any suitable computing device(s) (e.g., a laptop, a server, a tablet, a mobile computing device, etc.). The avatar 104 may be a relatively low-powered device, in some embodiments, such as a thin client, internet-of-things device, etc.

The avatar 104 may include one or more modules implemented as hardware (e.g., a hardware appliance) and/or computer readable instructions (e.g., software). For example, the avatar 104 may include the application 104-G. The application 104-G may include instructions that execute upon the occurrence of an event. For example, the avatar 104 may include a set of instructions for establishing one or more tunnel via network 106 at boot time, and/or in the event of a network change (e.g., if a new dynamic IP address is assigned by a dynamic host configuration protocol (DHCP) server). The avatar 104 may be communicatively coupled to an electronic database 110-B. The electronic database 110-B may store data relating to the customer's business operations.

In operation, a customer may have a contract with the IT services provider, or may be considering hiring the IT services provider to provide services. That is, the customer may be an established customer or a new customer contracting with the IT services provider on a trial basis. The customer may contact the IT services provider by visiting a website hosted in the remote computing device 102 or another computer of the IT services provider. The website may serve a web page to the customer including a menu of available services. The menu may differ, depending on the status of the customer (e.g., new customer or existing customer). It should be appreciated that in some embodiments, the customer may add more services or order new services via another electronic medium (e.g., a telephone call to the IT services provider). The customer may then select from the menu of available services, and submit a list of desired services.

The application 102-G may analyze the list of services desired by the customer and, based on the desired services of the customer, generate either a customized VM appliance and/or generate an order for the creation of a physical appliance (i.e., an avatar). The application 102-G may include instructions for immediately delivering the generated customized VM appliance to the customer via a download link, via email, and/or via an automated installation in the computing cloud 108. The computing cloud 108 may include a resource (e.g., an existing VM) owned/controlled by the customer. In some embodiments, the customer may be required to grant access to the IT services provider before the customized VM appliance may be installed. Part of the grant of access may include granting access to firewall rules of the customer. In that case, the IT services provider may automatically configure the customized VM appliance to run in the chosen cloud, optionally based on the type of cloud, instantiate the customized VM appliance, and automatically configure the firewall rules associated with the VM appliance. In some embodiments, instructions for installing and/or configuring the customer's VM and associated firewall rules manually may be displayed/communicated to the customer, such as when the customer indicates that they will perform the VM installation/configuration on their own.

The instructions for installing/configuring the customer's firewall rules manually may instruct the customer to, inter alia, download the customized VM appliance, launch the VM appliance in an appropriate hypervisor/VM emulator, provide the VM appliance with certain permissions in the virtualization environment (e.g., to network layers and/or devices), and/or perform certain networking tasks (e.g., create virtual/physical networking device nodes, modify permissions, open ports, filter network packets (e.g., IPv4 packets, IPv6 packets, etc.) by type, etc.). However, in general, the instructions may be limited to asking the customer to boot the VM and to open ports in the customer's external firewall. Specifically, the VM may be instantiated behind a general corporate or router-based firewall of the customer, and ports exterior to that corporate firewall may need to be opened to allow the IT services provider to reach the avatar 104 (i.e., the instantiated VM appliance/physical appliance). In some embodiments, the avatar 104 may be installed in a de-militarized zone (DMZ) of a network, which may obviate the need to open ports. In other cases, more complex procedures may be advised, such as establishing port-knocking software. Access-based controls such as VPN passthroughs via IPSec may be used.

When the customer boots the avatar for the first time, whether virtual or physical, the avatar may execute an initialization procedure including a set of executable program instructions. In an embodiment, the IT services provider may instantiate two or more multiple remote computing device 102. The two or more remote computing device 102 may perform different functions. For example, a first remote computing device 102 may perform a port forwarding function. A second remote computing device 102 may perform an intermediary host function. A third remote computing device 102 may perform a connection funnel function. A fourth remote computing device 102 may perform a firewalling function, and so on. Each of the two or more remote computing device 102 may include more or less hardware and/or software, and different sets of installed hardware and/or software as appropriate. For example, the port forwarder remote computing device 102 may include multiple physical interface devices to perform forward and reverse proxying operations using multiple physical and/or virtual (e.g., TUN/TAP) virtual network interface. The IT services provider may associate the remote computing device 102 with a particular customer. In that case, the remote computing device 102 may be known as a Base Management Node (BMN). The BMN may run services of the customer (e.g., a Remote Authentication Dial-In User Service (RADIUS)). In some embodiments, each customer of the IT services provider may be provided with a BMN wherein each BMN has an address that corresponds to the customer's environment. When a BMN is used, the avatar 104 provided by the IT services provider to the customer may be a thin client. If the thin client is stolen or misplaced, then sensitive material on the avatar may be minimized. Full disk encryption may, therefore, not be necessary and the avatar 104 may be invalidated and blocked from connecting to the BMN. From a risk perspective, keeping information segmented by the use of the avatar 104 is very beneficial and results in a much smaller hardware footprint and software footprint in the customer's network customer side. The avatar 104 may be a relatively low-powered device (e.g., an Internet-of-Things (IoT) device).

Once the avatar 104 is delivered to the customer, whether the avatar 104 is a physical device or a virtual machine, the avatar 104 may run an initialization procedure. The initialization procedure may take place only one time, when the avatar 104 is first connected to the network 106, for example. The initialization protocol may include the avatar 104 connecting to one of a plurality of purpose-built computing environments that are accessible via the network 106. The initialization protocol may include establishing a set of one or more tunnels between the avatar 104 and a set of one or more a BMNs. The initialization protocol is discussed further below.

Example Data Flow Diagram

Figure 2:
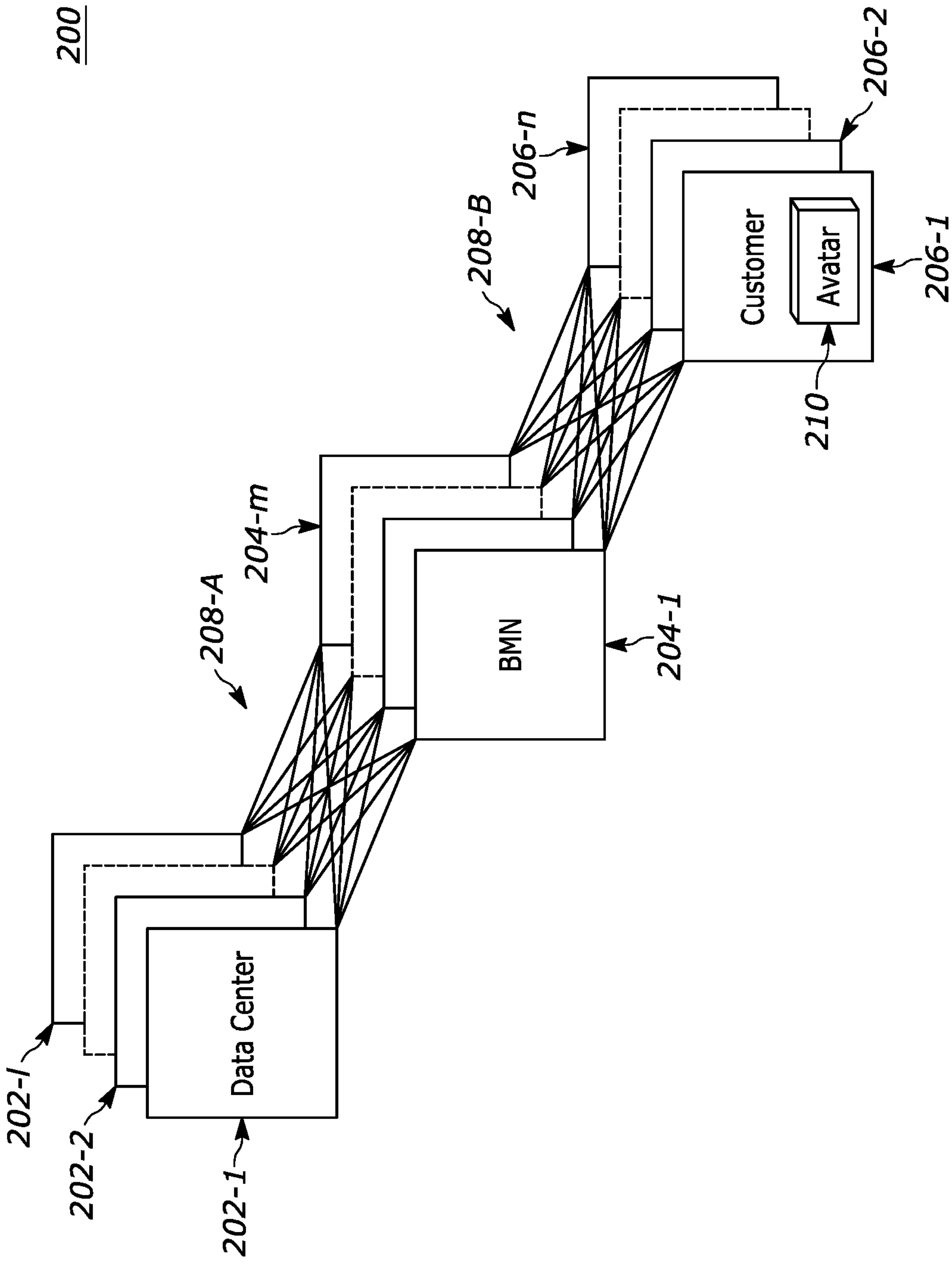
FIG. 2 depicts an exemplary data flow diagram, in accordance with various embodiments herein.

FIG. 2 is a data flow diagram 200 illustrating the operation of methods and systems for improved account management services. Some embodiments may include one or more data center. The data centers may include data center 202-1, 202-2, through **202-*l*, each of which may be located in the United States or elsewhere. The data flow diagram 200 may include BMNs 204-1, 204-2 through 204-*m*. The data flow diagram 200 may include customer infrastructure 206-1, 206-2 through 206-*n*. The numbers l, m, and n may be any positive integers. That is, data flow diagram 200 may include any number of data centers, BMNs, and/or customer infrastructure. The data flow diagram 200 depicts each data center as being communicatively coupled to each BMN via communication links 208-A, and each BMN as being communicatively coupled to each customer infrastructure via communication links 208-B. However, in some embodiments fewer links may exist. For example, links 208-A may include one communicative link between the data center 202-1 and the BMN 204-1. In some embodiments, each BMN may be linked to one corresponding customer infrastructure. Customer infrastructure 206-1 through 206-*n* may each include a respective set of one or more avatar 210, each of which may correspond to the avatar 102**, for example.

As discussed above, the avatar 210 may connect to one of a plurality of purpose-built computing environments during the initialization procedure. The avatar 210 may first connect to a connection broker, identifying the avatar 210 by providing a unique identifier (e.g., a universally-unique identifier (UUID)) to the connection broker as a parameter. The connection broker may compare the UUID to a list of avatars in a database, such as database 110-A, to identify a data center corresponding to the avatar 210. Based on the UUID, the connection broker may determine which BMN to build a connection to. Connecting to the connection broker may include identifying a monitoring environment for the customer. For example, a small customer may have a subscription with the IT services company to a service (e.g., a monitoring service) in a first data center (e.g., a data center located in Chicago). The tunnel may then be established to the first data center (e.g., the data center 202-1). Building the connection may include creating multiple TUN devices in the avatar 210. The connection broker may transmit a set of initialization data to the avatar 210, the initialization data including an IP address for the avatar. The avatar 210 may build a point-to-point (P2P) link, using the IP address, wherein packets flow seamlessly between the BMN 204-1 and devices in the customer infrastructure 206-1 via the avatar 210, over the P2P link. A P2P link may differ from an Ethernet link insofar as that the P2P link may be a network level (i.e., layer-3) link, whereas the Ethernet link may be a level-2 link. Various protocols (e.g., NTP, HTTP, RDP, etc.)

may be simultaneously routed between the customer environment 206-1 and the BMN 204-1. The initialization protocol may be run at given times (e.g., when a connection of the avatar 210 is disconnected, when the device or virtual machine implementing the avatar 210 reboots, on a schedule, etc.). The avatar 210 may also include a second initialization routine. For example, if the selected data center is unavailable, such as in the event of catastrophic failure, disaster recovery test, etc., then the avatar 210 may include a set of instructions for automatically routing to a fallback data center.

The avatar 210 may require two or more IP addresses in the customer infrastructure 206-1. For example, a first IP address may be used by the avatar 210 for connectivity inbound to the customer infrastructure 206-1, and a second IP address may be used for outbound connectivity to the BMN 204-1. The BMN may masquerade for services behind it, that is, services that are only accessible to users of the customer infrastructure 206-1 via the BMN. The customer may have limited visibility of the services behind the BMN. The linkages between the customer infrastructure 206-1 and the BMN 204-1 may be such that a user of customer infrastructure 206-1 through **206-*n* inspecting the network environment of customer infrastructure 206-1 (e.g., via ping) would not see any evidence of the IP address of the avatar 210 installed in the customer infrastructure 206-1. Rather, the customer would see an IP address belonging to the BMN. Additionally, the avatar 210 may enable computers in the customer's network to access the BMN without configuring firewalls, routers, etc. The customer may need to only open two or more ports in the customer infrastructure 204-1 firewall or another firewall. The avatar 210 may be located in any location that is communicatively coupled to the customer infrastructure can be located anywhere, and need not be located in the customer's physical or virtual network. In some embodiments, the avatar 210 can be located in a geographic region other than where the customer infrastructure 206-1** is located (e.g., in another country).

In general, the collection of avatar 210 machines and their respective links allow the IT services company to effectively manage customer environments at scale on a customer-by-customer basis, to meet the need of each customer. For example, some customers may be provided with redundant environments, data centers, avatars, and/or BMNs. A customer representing monthly revenue of $50 may not be provisioned redundantly. However, a $25,000/month customer may be provisioned using fully replicated/redundant resources. The IT services provider may operate a cloud system that enables on-demand horizontal scaling without practical resource limitations.

The architecture represented by data flow diagram 200 is much more cost effective than hardware-based systems of the past. As noted above, under old models, the IT services company had to send hardware to the customer at the outset of a business relationship, and periodically throughout the business relationship. Using the architecture represented by data flow diagram 200, the IT services company can provide just-in-time backend services, and can project services to the customer on demand by, for example, modifying a BMN associated with the customer. The scaling aspect is also very useful for prototyping and marketing purposes. Normally, an IT services company that wanted to provide 5,000 samples of IT services would need to send 5,000 managed hardware devices to individual customers. However, using the architecture represented by data flow diagram 200, the IT services company can send 5,000 invitations, and only activate as many avatar device resources (virtualized or hardware) as interested customers respond to the invitations.

The avatar 210 may be deployed into an existing cloud computing platform (e.g., via Amazon Web Services) by virtual deployment. The IT services provider may then connect to the customer infrastructure associated with the avatar 210 via the existing cloud to manage resources in the customer infrastructure that are not in the existing cloud as well as resources that are accessible via the existing cloud. Each customer may have their own virtual infrastructure from a networking and data traffic perspective. This isolation satisfies numerous compliance and security requirements.

The methods and systems described herein are applicable to any managed services environment including, without limitation, those of insurance, healthcare, manufacturing, e-commerce, and financial services companies. Federal, state, and municipal government IT resources may be managed using the architecture represented by data flow diagram 200. In some embodiments, concerns and/or suggestions regarding the architecture represented by data flow diagram 200 may result in infrastructure upgrades that may be propagated between customers. The architecture represented by data flow diagram 200 allow the IT services provider to expand the IT services provider's existing toolset into the customer's environment. For example, a service VM may be transferred via the avatar 210 to the customer infrastructure 206-1. The service VM may be accessible only by the IT services provider, and may include instructions for analyzing and modifying aspects of the customer infrastructure 206-1. Tools, firewall rules, and other resources that customers might typically need for IT services may be eliminated. Further, because the IT services provider has greater direct control over the service environment (e.g., the remote computing device 102), the IT services provider can tune those critical aspects of the service environment (e.g., geographic redundancy, high-availability, etc.) on an as-needed basis.

As another example, the architecture represented by data flow diagram 200 enables an IT service provider to provide account management services, as described further herein. Namely, the BMN 204-1 may mediate communications (i.e., data packets) between the customer 206-1 and a data center 202-1, such that updates to accounts transmitted from the customer 206-1 may be routed to the data center 202-1 in an encrypted format. The BMN 204-1 may not store and/or otherwise have access to the encryption key used to encrypt the account updates, so the BMN 204-1 may simply route the updates to the data center 202-1 without interpreting any portion of the encrypted payload of the account updates. Instead, the BMN 204-1 may analyze an unencrypted header or other suitable portion of the account updates in order to determine the appropriate routing to the data center 202-1 in which the accounts associated with the customer 206-1 are stored. The data center 202-1 may receive these account updates, decrypt the payload, and proceed to update the stored accounts in accordance with the updates included in the decrypted account updates. In any event, these and other functionalities may be described further herein in reference to FIGS. 4 and 5.

Example Automated it Services Management System

Figure 3:
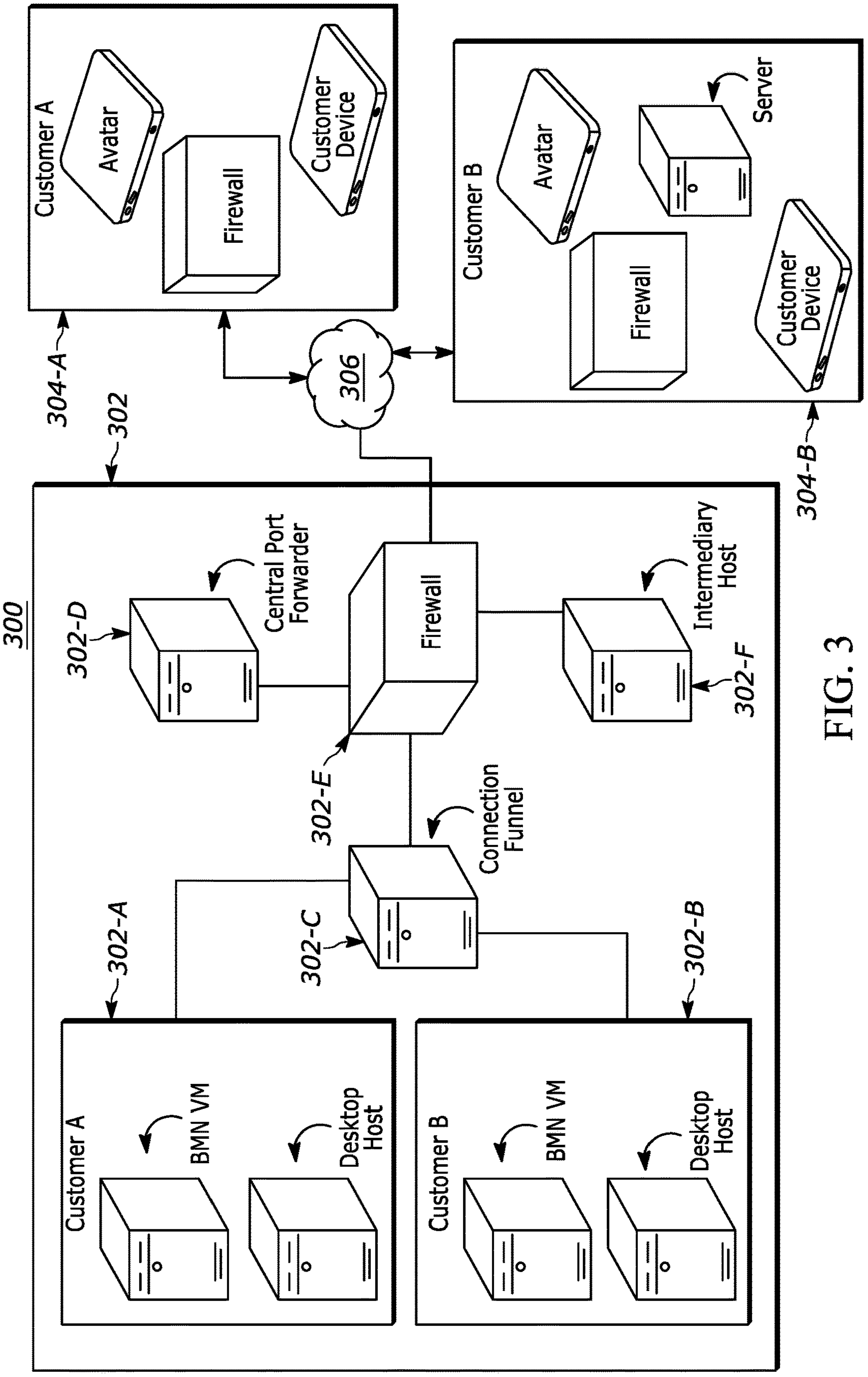
FIG. 3 is a system diagram depicting an IT service provider infrastructure, in accordance with various embodiments herein.

FIG. 3 is a system diagram 300 including an IT service provider infrastructure 302 including respective customer hosting regions and customer infrastructure, and a network 306. The IT service provider infrastructure 302 may include a customer service region 302-A, a customer service region 302-B, a connection funnel 302-C, a central port forwarder 302-D, a firewall 302-E, and an intermediary host 302-F.

Although only two customer service regions are depicted, any practical number of customers and service regions may be supported in IT service provider infrastructure 302. System diagram 300 may also include a customer infrastructure 304-A and a customer infrastructure 304-B, which may correspond, respectively, to the customer service region 302-A and the customer service region 302-B. The customer infrastructure 304-A and the customer infrastructure 304-B may represent data centers of the respective customers. The IT service provider infrastructure 302 may be communicatively coupled to the customer infrastructure 304-A and the customer infrastructure 304-B via the network 306. The network 306 may correspond to the network 106 depicted in FIG. 1.

As noted above, the avatar in customer infrastructure 304-A may execute initialization instructions based upon the occurrence of an event (e.g., at boot time, if connectivity is lost, upon receiving/retrieving a signal, etc.). In some embodiments, the avatar may correspond to the avatar 104 and/or the avatar 210. The initialization instructions may include connecting the avatar to one or more connection broker (not depicted). The connection broker may be thought of as a traffic director. The avatar may identify itself by providing an identification parameter to the connection broker, and the connection broker may determine the owner/controller customer associated with the avatar by associating the identification parameter in a database comprising customer information, such as the database 110-A. The connection broker may determine one or more priority data centers (e.g., Chicago and Milwaukee). The data center(s), which may correspond to the data center 202-1 through the data center 202-*l* of FIG. 2, may be based on geographic proximity to the avatar, in some embodiments. Because multiple priority data centers are identified, if one of the data centers is unreachable, one of the other data centers may act to handle the customer's connectivity.

The avatar may then connect to the intermediary host 302-F. By default, the avatar may be unreachable from the Internet. When the avatar connects to the intermediary host 302-F (e.g., via secure shell (SSH)), the avatar may create a persistent connection to the intermediary host 302-F. The intermediary host 302-F may reside in the provider infrastructure 302, and may be accessible only from within the provider infrastructure 302. Therefore, in an embodiment, a host (e.g., a networked computer) in the provider infrastructure 302 may be able to connect to the avatar via the intermediary host 302-F and the customer firewall within the customer infrastructure 304-A, without creating a connection that is visible to hosts on the open Internet (e.g., hosts accessible via the network 306). Here, the intermediary host 302-F may have a level of trust that is higher than other hosts, and various forms of authentication may be used to enforce access to the customer infrastructure 304-A (e.g., public and/or private key authentication, multi-factor authentication, etc.).

In an embodiment, the connection between the avatar and the intermediary host 302-F may comprise two network tunnels. The two tunnels may allow traffic to flow to and from the avatar via the intermediary host 302-F. Further, one or more additional persistent tunnels may be created between components of the customer service region 302-A and the avatar via the intermediary host 302-F. establishing one or more tunnel linked to the one or more respective remote computing device 102.

From the perspective of a customer within the customer infrastructure 304-A, the BMN of customer service region 302-A may appear to be directly connected to the customer infrastructure 304-A, even though several network hops are required to reach the BMN. The BMN may be located in a data center. Furthermore, the BMN may be associated with one or more services that the BMN is responsible for forwarding to the customer in the forward and reverse direction. For example, one or more monitoring collector may be associated with the BMN. Each of the one or more monitoring collector may collect data from the customer infrastructure 304-A via the connection(s) linking the avatar to the BMN discussed above. The BMN may transparently proxy/masquerade the connections to and from the avatar via the BMN, such that if the customer were to inspect the packets, the customer would not be able to tell that a particular one of the one or more monitoring collector was initiating and/or receiving the traffic. Additionally, the customer may not able to determine the ultimate destination of any packets sent to the BMN.

In some embodiments, 302 is a single pod. Each one may have a central port forwarder 302-D, connection funnel 302-C, etc. In this way, a customer may have their own set of services and tunnel stack, keeping the customer environments segregated and not inter-accessible. In some embodiments, the separation may be enforced in user space via a software-defined network. The firewall 302-E may restrict the packets that may be passed between the intermediary host 302-F and the connection broker.

In some embodiments, the connection funnel 302-C may include IP blacklists on a per-BMN and/or per-customer basis. For example, the connection funnel 302-C may include a list C of customers $C_1$-$C_n$ in association with an address space for each customer C, wherein n is a positive integer. The connection funnel 302-C may be a software-driven firewall including rules for filtering packets according to whether a given BMN may transmit packets to a given address space of a particular customer in C. For example, the BMN depicted in customer service 302-B may have a first Ethernet card (e.g., eth0). Connection funnel 302-C may include firewall instructions such that packets from the first Ethernet card having an IP address matching the BMN may only be sent to hosts in the IP range 8.9.10.0-8.9.10.255. That is, only 256 hosts could possibly receive packets from that BMN, and no others. In some embodiments, the firewall instructions may similarly restrict other BMNs (e.g., the BMN in customer service region 302-A) from sending packets to those IP ranges. In some embodiments, the IP range may be specified as a set of Classless Inter-Domain Routing (CIDR) network specification. For example, to continue the example, the above IP range could be specified as 8.9.10.0/24. Network traffic may also be restricted to only that traffic sent via the intermediary host 302-F on a given port.

The customer funnel 302-C includes rules preventing customer service region 302-A from contacting customer service region 302-A. The connection funnel 302-C is automatically updated any time a new customer service region is added and/or deleted. When an appliance comes online, the customer service region is created, and the appropriate firewall rules are automatically added to the connection funnel 302-C.

In this manner, the IT service provider infrastructure 302 improves the security of such route provisioning and/or general communications between the infrastructure 302 and individual customer infrastructures 304-A, 304-B relative to conventional techniques by limiting the connectivity of individual customer service regions 302-A, 302-B (e.g., BMNs) to specified IP addresses. Additionally, the automatic appropriation of firewall rules and updating of the connection funnel 302-C upon creation of a new customer service region further improves over conventional techniques, such that communications between customer service regions 304-A, 304-B and the IT service provider infrastructure 302 are significantly more difficult to intercept and/or circumvent. These advantages, inter alia, are leveraged when, e.g., providing account management services that rely on secure communications between a customer service region 302-A, 302-B and the IT service provider infrastructure 302, as described herein in reference to FIGS. 4 and 5.

Example Operation of Automated Information Technology Services Management

Figure 4:
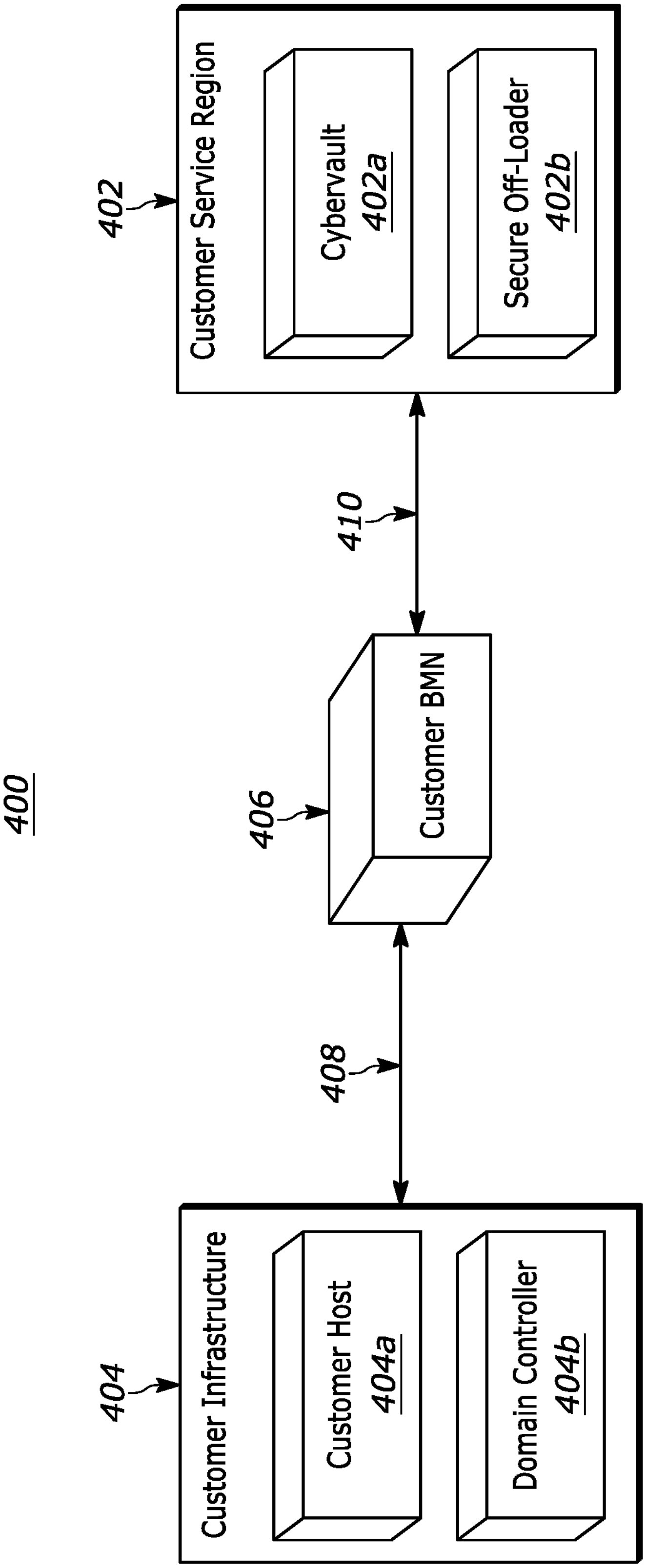
FIG. 4 depicts an exemplary operation environment, in accordance with various embodiments herein.

FIG. 4 depicts an exemplary operation environment 400, in accordance with various embodiments herein. The exemplary operation environment 400 may include a customer service region 402, a customer infrastructure 404, and a customer BMN 406. The customer service region 402 may correspond to, for example, the customer service region 302-A of FIG. 3. The customer service region 402 may reside in a data center of the IT services provider, such as data center 202-1 of FIG. 2. The customer infrastructure 404 may correspond to the customer infrastructure 304-A, or another customer infrastructure, of FIG. 3. Operation environment 400 may include a connection funnel, central port forwarder, firewall, and intermediary host; which may respectively correspond to the connection funnel 302-C, the central port forwarder 302-D, firewall 302-E, and intermediary host 302-F of FIG. 3. A connection broker may also be included in the environment 400. The connection broker may correspond to the remote computing device 102 of FIG. 1.

In operation environment 400, the customer service region 402 may correspond to the customer service region 302-A of FIG. 3, for example. Generally, the customer service region 402 may obtain/receive encrypted updated account lists from the customer infrastructure 404, and the customer service region 402 may decrypt and analyze the updated account lists to replace stored entries in an account list corresponding to the specific customer associated with the customer infrastructure 404. More specifically, the customer service region 402 may transmit an encryption key and an account list to the BMN 406 (e.g., via network communication link 410) for subsequent routing to the customer infrastructure 404 (e.g., via network communication link 408). The customer infrastructure 404 may retrieve, encrypt, and transmit (or retrieve and transmit if already encrypted) an updated account list to the BMN 406 (e.g., via network communication link 408) for subsequent routing back to the customer service region 402 (e.g., via network communication link 410). The customer service region 402 may then proceed to decrypt and analyze the updated account lists to replace stored entries in the account list corresponding to the specific customer associated with the customer infrastructure 404.

As described herein, an account list may generally include accounts for a plurality of users, where each account includes one or more account credentials of a customer stored on the cybervault 402*a*. The account credentials may correspond to individual employees and/or other authorized users of the customer, and may generally include data such as account password(s), account group membership(s), and/or an account activity status. The account password(s) may correspond to passwords that grant access to the specific user's credentials and/or a profile associated with the specific user. The account group membership(s) may generally indicate one or more groups, to which, a specific user is associated, such that the specific user may, e.g., access documents requiring group membership, participate in/perform actions on behalf of the customer requiring group membership, and/or other actions or combinations thereof. The account activity status may generally indicate the activity level of the user's profile/account, and/or may be or include metadata, such as a user's name, location, whether or not the user is based in a particular location, and/or the like. Namely, the account activity status may include metadata indicating whether or not the user associated with the credential(s) frequently and/or recently accesses and/or otherwise utilizes the credential(s) included in the account list for the user. Additionally, or alternatively, the account activity status may include metadata indicating a user's first name, middle name, last name, and the account activity status may further include metadata indicating that the user is currently located/working in the United Kingdom (e.g., listed and/or otherwise indicated as a multi-character country code, UK). Moreover, the account activity status may include metadata indicating that the user is based in the United States, such that work performed by the user may typically be performed during working hours corresponding to the various time zones in the United States.

As an example, a first employee of a customer may have a first account credential stored in the cybervault 402*a* as part of the customer's account list that includes a first account password and a first account group membership, and a second employee of the customer may have a second account credential stored in the cybervault 402*a* as part of the customer's account list that includes a second account password and a second account group membership. In this example, the first account password may be different from the second account password, and the first account group membership may be or include different group membership (s) than the second account group membership.

Accordingly, updating the account list may include updating/modifying/changing multiple aspects of the account list. In some embodiments, updating the account list includes generating new account passwords for one or more of the users included in the account list. In certain embodiments, updating the account list includes updating and/or otherwise modifying the account group memberships for one or more of the users included in the account list. Moreover, in certain embodiments, the customer service region 402, the customer infrastructure 404, and/or the BMN 406 may include separate facilities for different updates performed to an account list. For example, the secure off-loader 402*b* may allocate separate resources to perform account password updating and account group membership updating, such that the account lists may be updated with new account passwords at different times and/or at different frequencies than updates are applied to the account group memberships.

In any event, the customer service region 402 may generally include a cybervault 402*a* and a secure off-loader 402*b*. The cybervault 402*a* may generally store account lists for customers that include user profile/credential information for each of the authorized users of the individual customer. The secure off-loader 402*b* may generally prepare updated account lists for entry into the cybervault 402*a*. More specifically, the secure off-loader 402*b* may decrypt and parse updated account lists received from the customer infrastructure 404 through the BMN 406, and the secure off-loader 402*b* may update the entries stored in the cybervault 402*a* by replacing each stored entry in the stored account list with an analogous entry in the decrypted updated account list. In certain embodiments, the customer service region 402 may include the customer BMN 406, for example, in the form of a BMN virtual machine and a desktop host.

The customer infrastructure 404 may generally include a customer host 404*a* and a domain controller 404*b*. The customer host 404*a* may generally be or include a host server or device (e.g., laptop, desktop, etc.) configured to run a set of executable instructions that may cause the processors of the host server or device to perform one or more actions of the methods described herein. The set of executable instructions may take the form of an application or computer program (e.g., Powershell) that the customer may access at any suitable time to perform one or more of the actions described herein. The domain controller 404*b* may generally include one or more active directories corresponding to employees and/or other authorized users of the customer. These active directories may be maintained by the customer as part of the customer infrastructure 404 during operations of the customer, such that activity statuses, permissions, and/or other account credentials for authorized users of the customer may change within the domain controller 404*b* upon execution of the set of executable instructions stored in the customer host 404*a*. The customer infrastructure 404 may also include other appliances and/or customer devices behind a firewall associated with the customer infrastructure 404. Further, the network communication links 408, 410 may correspond to communication links provided by the network 106 of FIG. 1 and the network 306 of FIG. 3.

As illustrated in FIG. 4, the customer service region 402 may communicate with the BMN 406 across the network communication link 410, and the customer infrastructure 404 may communication with the BMN 406 across the network communication link 408. In this manner, the customer service region 402 may communicate with the customer infrastructure 404 through the BMN 406. Customers can modify the instructions (e.g., Powershell) stored on the computer host 402*a* in order to more effectively manage the particular configuration of groups they have as part of their organization. For example, a first customer may have an organizational structure configured to organize users into a set of five potential groups, and a second customer may have an organizational structure configured to organize users into a set of three potential groups. The first customer utilizing a first instance of the customer infrastructure 404 may modify the configuration of the executable instructions stored on the customer host 404*a* to be able to organize users into one or more of the five potential groups, and the second customer utilizing a second instance of the customer infrastructure 404 may modify the configuration of the executable instructions stored on the customer host 404*a* to be able to organize users into one or more of the three potential groups.

Additionally, or alternatively, customers using the customer infrastructure 404 can run scripts included as part of the customer host 404*a* in order to make account list updates as many times as is necessary and/or desirable. For example, a first customer may be a large organization and may need to update the corresponding account lists multiple times per day, whereas a second customer may be a small organization that only updates the corresponding account lists once a day. In either case, the customer may configure the instructions of the customer host 404*a* to accommodate the updating schedule/frequency as necessary to meet the needs of the customer. However, very frequent updates, particularly when out of character for a particular customer may indicate fraudulent activity that should be reported to the customer, and any subsequent actions associated with the customer account list halted. Thus, in certain embodiments, customers that attempt to update account lists more than a threshold amount per day may trigger a hold on their accounts, and may cause the customer infrastructure 404 and/or other components (e.g., BMN 406) to generate an alert for display to the customer.

By contrast, a customer that does not update any account lists within a certain period of time may indicate that the instructions of the customer host 404*a* may require and update and/or other servicing. Accordingly, the customer infrastructure 404 may periodically transmit check requests to the customer service region 402 to determine a most recent date when the customer host 404*a* executed an update of the account lists for the customer. If the most recent date fails to satisfy an updating threshold (e.g., exceeds the updating threshold), then the customer infrastructure 404 may generate and transmit an alert to the customer service region 402 indicating that the customer host 404*a* may require an updated and/or other servicing.

As part of the transmission of encrypted updated account lists, the secure off-loader 402*b* may generate public keys that are transmitted to the customer infrastructure 404. Using the public key, the customer host 404*a* may encrypt the updated account list prior to transmitting the updated account list to the BMN 406 for routing back to the customer service region 402. The secure off-loader 402*b* may maintain a private key on the customer service region 402, such that neither the customer infrastructure 404 nor the BMN 406 has access to the private key. When the customer service region 402 receives the encrypted updated account list from the BMN 406, the secure off-loader 402*b* may utilize the private key to decrypt the updated account list. In this manner, the transmissions between the customer service region 402 and both the BMN 406 and the customer infrastructure 404 are secured because the private key is never accessible outside of the customer service region 402.

Regardless, prior to decrypting the updated account list, the secure off-loader 402*b* may also perform several security checks related to the format, size, etc. of the payload of the encrypted updated account list. For example, the customer host 404*a* may encrypt the updated account list in accordance with a suitable encryption program (e.g., GNU Privacy Guard (GnuPG)), and the secure off-loader 402*b* may check that the format, size, and other features of the encrypted updated account list conform with and/or otherwise satisfy the configuration(s) germane to the encryption program.

As a result of the configuration corresponding to the operation environment 400, a customer utilizing the customer infrastructure 404 may execute the instructions (e.g., Powershell) stored on the computer host 402*a* in order to update account lists stored in the customer service region 402. Updating these account lists may thereby enable the IT service provider hosting the customer service region 402 to maintain a more accurate accounting of how/why/etc. the customer is utilizing their provisioned services. Thus, the IT service provider may understand how to better provide IT services for each customer, according to the specific needs, configurations, and tendencies of each customer as identified by the account list configurations and updates provided by each customer.

It should be appreciated by those of skill in the art that in the examples discussed above, the IT services provider is well-positioned to provide additional assistance to the customer. In general, the techniques discussed above allow the IT services provider to deploy assets (e.g., VMs) into the customer's environment on an as-needed basis, and to be poised to provide additional services without any delay based on the account list updates received from the customer infrastructure 404.

Example Method

Figure 5:
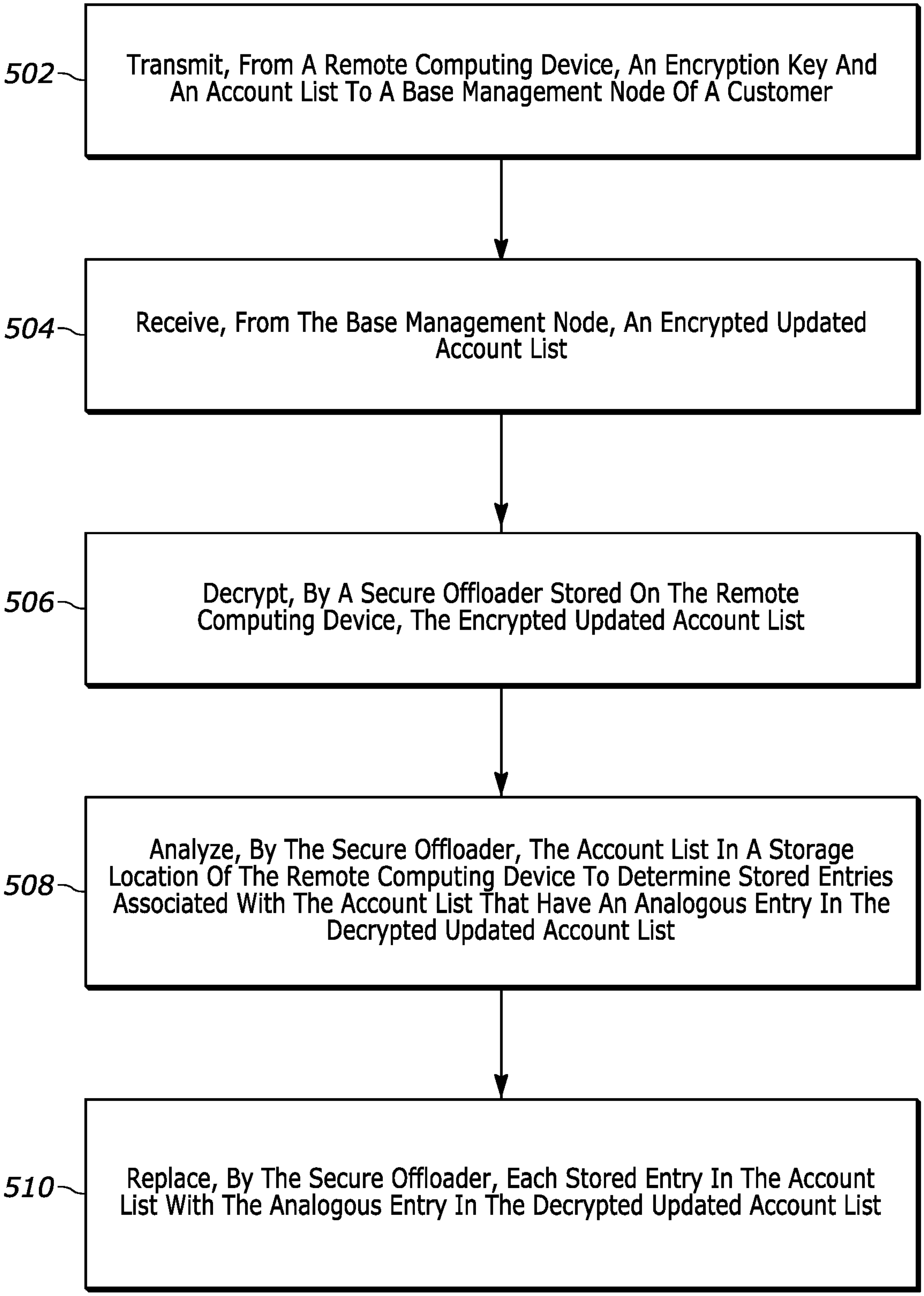
FIG. 5 is a block diagram of an exemplary method for providing improved account management services, in accordance with various embodiments herein.

FIG. 5 is a block diagram of an exemplary method 500 for providing improved account management services, in accordance with various embodiments herein. Generally speaking, the actions described herein in reference to FIG. 5 may be performed, in part or in whole, by any of the customer service region 402, the customer infrastructure 404, the BMN 406, and/or any other components described herein or combinations thereof. Further, it should be appreciated that any of the actions of the exemplary method 500 described herein may be performed any suitable number of times, in any suitable order, and/or may be optional in certain embodiments.

The method 500 may include transmitting, from a remote computing device, an encryption key and an account list to a base management node of a customer (block 502). In certain embodiments, the account list may include an account credential corresponding to a user, and the account credential includes at least one of: (i) an account password, (ii) an account group membership, or (iii) an account activity status.

The method 500 may further include receiving, from the base management node, an encrypted updated account list (block 504). The method 500 may further include decrypting, by a secure off-loader stored on the remote computing device, the encrypted updated account list (block 506). In some embodiments, the remote computing device is a first remote computing device, the base management node is communicatively coupled to a second remote computing device. Further in these embodiments, the method 500 may further include transmitting, by the base management node, the encryption key and the account list to the second remote computing device, and modifying, by the second remote computing device, an account credential included as part of the account list to generate an updated account list. Still further in these embodiments, the method 500 may include encrypting, by the second remote computing device, the updated account list using the encryption key, and transmitting the encrypted updated account list to the base management node.

The method 500 may further include analyzing, by the secure off-loader, the account list in a storage location of the remote computing device to determine stored entries associated with the account list that have an analogous entry in the decrypted updated account list (block 508). In certain embodiments, the method 500 may further include parsing, by the secure off-loader, each entry of the decrypted updated account list, and comparing, by the secure off-loader, each parsed entry of the decrypted updated account list with the stored entries associated with the account list. Based on the comparing, the method 500 may further include determining the stored entries associated with the account list that have the analogous entry in the decrypted updated account list.

The method 500 may further include replacing, by the secure off-loader, each stored entry in the account list with the analogous entry in the decrypted updated account list (block 510). In certain embodiments, the method 500 may further include, responsive to replacing each stored entry in the account list with the analogous entry, updating, by the secure offloader, a local configuration stored in the storage location of the remote computing device to indicate a recent update to the account list.

In some embodiments, the method 500 may further include determining, by the remote computing device, a number of encrypted updated account lists received at the remote computing device during a first period, and comparing the number of encrypted updated account lists received during the first period to an updated account list receipt threshold. Further in these embodiments, the method 500 may further include, responsive to determining that the number of encrypted updated account lists received during the first period exceeds the updated account list receipt threshold, generating, by the remote computing device, an alert for transmission to the customer. Still further in these embodiments, the method 500 may further include blocking, by the remote computing device, any subsequent data transmission between the remote computing device and the base management node of the customer.

In certain embodiments, the method 500 may further include determining, by the remote computing device, a number of periods since the encrypted updated account list was received, and comparing the number of periods to a period threshold. Further in these embodiments, and responsive to determining that the number of periods exceeds the period threshold, the method 500 may further include generating, by the remote computing device, an alert for transmission to the customer indicating that the account list should be updated.

In some embodiments, and as previously mentioned, the account list may include accounts for a plurality of users, and each account may include one or more account group attributes. Further in these embodiments, the method 500 may further include receiving, at the remote computing device, an update to an account group attribute for an account in the account list; and updating, by the secure off-loader, the account group attribute for the account in the account list.

These account group attributes may generally communicate skills possessed by individual users. For example, an account group attribute may generally indicate that a particular user is skilled in Unix-based software, or that the user is skilled in networking or security. In this example, the customer transmitting the updates to the account list may perform and/or require skills in Unix-based software, and may desire to view user accounts that contain the account group attribute corresponding to Unix-based software skills. Accordingly, the customer may transmit instructions to only view accounts that have the Unix account group attribute. In some embodiments, the customer may update accounts on the account list by adding/removing certain account group attributes to particular user accounts. For example, as a user becomes proficient in Unix-based software, the user may receive the Unix account group attribute as part of their account. In reference to FIG. 4, the customer host 404*a* may update the domain controller 404*b* to create and/or otherwise add such account group attributes to user accounts.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the following text sets forth a detailed description of numerous different embodiments, it should be understood that the legal scope of the description is defined by the words of the claims set forth at the end of this text. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed:

1. A computer-implemented method for providing improved account management services, comprising:

transmitting, from a first remote computing device, an encryption key and an account list to a base management node of a customer;

transmitting, by the base management node, the encryption key and the account list to a second remote computing device;

modifying, by the second remote computing device, an account credential included as part of the account list to generate an updated account list;

encrypting, by the second remote computing device, the updated account list using the encryption key;

receiving, from the base management node at the first remote computing device, an encrypted updated account list that is encrypted by the second remote computing device using the encryption key and the account list, the second remote computing device being different from the first remote computing device and the base management node;

decrypting, by a secure off-loader stored on the first remote computing device, the encrypted updated account list;

analyzing, by the secure off-loader, the account list in a storage location of the first remote computing device to determine stored entries associated with the account list that have an analogous entry in the decrypted updated account list by:

parsing, by the secure off-loader, each entry of the decrypted updated account list;

comparing, by the secure off-loader, each parsed entry of the decrypted updated account list with the stored entries associated with the account list; and based on the comparing, determining, by one or more processors of the first remote computing device, the stored entries associated with the account list that have the analogous entry in the decrypted updated account list;

replacing, by the secure off-loader, each stored entry in the account list with the analogous entry in the decrypted updated account list;

determining, by the first remote computing device, a number of encrypted updated account lists received at the first remote computing device during a first period;

comparing, by the first remote computing device, the number of encrypted updated account lists received during the first period to an updated account list receipt threshold;

responsive to determining that the number of encrypted updated account lists received during the first period exceeds the updated account list receipt threshold or a period threshold corresponding to a number of periods since the encrypted updated account list was received, generating, by the first remote computing device, an alert for transmission to the customer; and blocking, by the first remote computing device, any subsequent data transmission between the first remote computing device and the base management node of the customer.

2. The computer-implemented method of claim 1, wherein the account list includes an account credential corresponding to a user, and the account credential includes at least one of: (i) an account password, (ii) an account group membership, or (iii) an account activity status.

3. The computer-implemented method of claim 1, further comprising:

responsive to replacing each stored entry in the account list with the analogous entry, updating, by the secure off-loader, a local configuration stored in the storage location of the first remote computing device to indicate a recent update to the account list.

4. The computer-implemented method of claim 1, further comprising:

determining, by the first remote computing device, the number of periods since the encrypted updated account list was received;

comparing, by the first remote computing device, the number of periods to the period threshold; and responsive to determining that the number of periods exceeds the period threshold, generating, by the first remote computing device, an alert for transmission to the customer indicating that the account list should be updated.

5. The computer-implemented method of claim 1, wherein the account list includes accounts for a plurality of users, each account includes one or more account group attributes, and the computer-implemented method further comprises:

receiving, at the first remote computing device, an update to an account group attribute for an account in the account list; and updating, by the secure off-loader, the account group attribute for the account in the account list.

6. A computing system comprising:

one or more processors; and a memory storing instructions that, when executed by the one or more processors, cause the computing system to:

transmit an encryption key and an account list to a base management node of a customer, transmit, by the base management node, the encryption key and the account list to a remote computing device, modify, by the remote computing device, an account credential included as part of the account list to generate an updated account list, encrypt, by the remote computing device, the updated account list using the encryption key, receive, from the base management node at the one or more processors, an encrypted updated account list that is encrypted by the remote computing device using the encryption key and the account list, the remote computing device being different from the computing system and the base management node, decrypt the encrypted updated account list, analyze the account list to determine stored entries associated with the account list that have an analogous entry in the decrypted updated account list by:

parsing each entry of the decrypted updated account list, comparing each parsed entry of the decrypted updated account list with the stored entries associated with the account list, and based on the comparing, determining, by the one or more processors, the stored entries associated with the account list that have the analogous entry in the decrypted updated account list, replace each stored entry in the account list with the analogous entry in the decrypted updated account list, determine a number of encrypted updated account lists received during a first period, compare, by the one or more processors, the number of encrypted updated account lists received during the first period to an updated account list receipt threshold, responsive to determining that the number of encrypted updated account lists received during the first period exceeds the updated account list receipt threshold or a period threshold corresponding to a number of periods since the encrypted updated account list was received, generate an alert for transmission to the customer, and block any subsequent data transmission to the base management node of the customer.

7. The computing system of claim 6, wherein the account list includes an account credential corresponding to a user, and the account credential includes at least one of: (i) an account password, (ii) an account group membership, or (iii) an account activity status.

8. The computing system of claim 6, wherein the instructions, when executed, further cause the computing system to:

responsive to replacing each stored entry in the account list with the analogous entry, update a local configuration to indicate a recent update to the account list.

9. The computing system of claim 6, wherein the instructions, when executed, further cause the computing system to:

determine the number of periods since the encrypted updated account list was received;

compare, by the one or more processors, the number of periods to the period threshold; and responsive to determining that the number of periods exceeds the period threshold, generate an alert for transmission to the customer indicating that the account list should be updated.

10. The computing system of claim 6, wherein the account list includes accounts for a plurality of users, each account includes one or more account group attributes, and the instructions, when executed, further cause the computing system to:

receive an update to an account group attribute for an account in the account list; and update the account group attribute for the account in the account list.

11. A non-transitory computer readable medium containing program instructions that when executed, cause a computer to:

transmit an encryption key and an account list to a base management node of a customer;

transmit, by the base management node, the encryption key and the account list to a remote computing device;

modify, by the remote computing device, an account credential included as part of the account list to generate an updated account list;

encrypt, by the remote computing device, the updated account list using the encryption key;

receive, from the base management node at the computer, an encrypted updated account list that is encrypted by the remote computing device using the encryption key and the account list, the remote computing device being different from the computer and the base management node;

decrypt the encrypted updated account list;

analyze the account list to determine stored entries associated with the account list that have an analogous entry in the decrypted updated account list by:

parsing each entry of the decrypted updated account list, comparing each parsed entry of the decrypted updated account list with the stored entries associated with the account list, and based on the comparing, determining the stored entries associated with the account list that have the analogous entry in the decrypted updated account list;

replace each stored entry in the account list with the analogous entry in the decrypted updated account list;

determine a number of encrypted updated account lists received during a first period;

compare, by the computer, the number of encrypted updated account lists received during the first period to an updated account list receipt threshold;

responsive to determining that the number of encrypted updated account lists received during the first period exceeds the updated account list receipt threshold or a period threshold corresponding to a number of periods since the encrypted updated account list was received, generate an alert for transmission to the customer; and block any subsequent data transmission to the base management node of the customer.

12. The non-transitory computer readable medium of claim 11, wherein the account list includes an account credential corresponding to a user, and the account credential includes at least one of: (i) an account password, (ii) an account group membership, or (iii) an account activity status.

13. The non-transitory computer readable medium of claim 11, wherein the program instructions, when executed, further cause the computer to:

responsive to replacing each stored entry in the account list with the analogous entry, update a local configuration to indicate a recent update to the account list.

* * * * *